(12) United States Patent  (10) Patent No.: US 7,082,661 B2
Ijames et al.  (45) Date of Patent: Aug. 1, 2006

(54) CENTRIFUGALLY ASSISTED CLUTCH

(75) Inventors: Carl E. Ijames, Cuba, MO (US);
James Fox, Sullivan, MO (US);
Frederick J. Eickelmann, Cuba, MO (US)

(73) Assignee: Ace Manufacturing & Parts Company, Sullivan, MO (US)

( * ) Notice: Subject to any disclaimer, the term of this patent is extended or adjusted under 35 U.S.C. 154(b) by 0 days.

(21) Appl. No.: 10/728,199

(22) Filed: Dec. 4, 2003

(65) Prior Publication Data

US 2004/0163923 A1 Aug. 26, 2004

Related U.S. Application Data

(60) Provisional application No. 60/430,969, filed on Dec. 4, 2002.

(51) Int. Cl.
*B21K 21/16* (2006.01)
(52) U.S. Cl. .................. 29/401.1; 29/434; 29/557; 192/70.29; 192/70.3; 192/99 A
(58) Field of Classification Search ............... 29/401.1, 29/432, 557, 558, 434; 192/70.13, 70.27, 192/70.29, 70.3, 89.1, 99 A, 103 R, 105 C, 192/112
See application file for complete search history.

(56) References Cited

U.S. PATENT DOCUMENTS

| | | | | |
|---|---|---|---|---|
| 2,038,017 A | * | 4/1936 | Wemp | 192/99 A |
| 2,234,459 A | * | 3/1941 | Wemp | 192/70.18 |
| 2,234,460 A | * | 3/1941 | Wemp | 192/70.29 |
| 2,300,521 A | * | 11/1942 | Spase | 192/103 A |
| 2,657,781 A | * | 11/1953 | Zeidler | 192/99 A |
| 3,010,555 A | * | 11/1961 | Garmager | 192/109 A |
| 3,213,986 A | * | 10/1965 | Smirl | 192/70.12 |
| 3,305,060 A | * | 2/1967 | Zeidler | 192/70.19 |
| 3,334,716 A | * | 8/1967 | Spokas | 192/70.29 |
| 3,627,089 A | * | 12/1971 | Dence | 192/145 |
| 3,891,072 A | * | 6/1975 | Sink et al. | 192/99 A |
| 4,298,112 A | | 11/1981 | Carstensen | |
| 4,425,991 A | | 1/1984 | Hays | |
| 4,629,048 A | | 12/1986 | Draper et al. | |
| 4,732,251 A | | 3/1988 | Tipton | |
| 4,770,282 A | | 9/1988 | Maycock et al. | |
| 4,793,456 A | | 12/1988 | Kummer et al. | |
| 4,815,189 A | * | 3/1989 | Ijames et al. | 29/401.1 |
| 4,890,708 A | | 1/1990 | Kitano et al. | |
| 4,986,403 A | | 1/1991 | Tipton | |
| 5,033,598 A | | 7/1991 | Tipton | |
| 5,033,599 A | | 7/1991 | Hays | |
| 5,205,388 A | | 4/1993 | Hashimoto et al. | |

(Continued)

*Primary Examiner*—Essama Omgba
(74) *Attorney, Agent, or Firm*—Senniger Powers

(57) ABSTRACT

A friction clutch assembly connects driving and driven shafts and has a pressure plate axially moveable between an engaged position transmitting torque from the driving shaft to the driven shaft and a disengaged position. A cover is mounted on the flywheel and a spring is mounted on the cover. The spring urges the pressure plate into the engaged position and compression of the spring allows for movement of the pressure plate to the disengaged position. At least one lever assembly has a housing mounted on the cover, a lever pivotable in the housing to apply an axial force urging the pressure plate to the engaged position. A lever assembly spring is associated with the cartridge to bias against the pivoting movement of the lever and delay the pivoting movement of the lever until the clutch assembly reaches a predetermined rotational speed.

17 Claims, 16 Drawing Sheets

U.S. PATENT DOCUMENTS

| | | | |
|---|---|---|---|
| 5,361,882 A | 11/1994 | Tipton | |
| 5,375,688 A | 12/1994 | Hays | |
| 5,377,803 A | 1/1995 | Link et al. | |
| 5,407,047 A * | 4/1995 | Weidinger et al. | 192/70.13 |
| 5,499,704 A | 3/1996 | Hays | |
| 5,593,015 A | 1/1997 | Kosumi et al. | |
| 5,597,060 A * | 1/1997 | Huddleston et al. | 192/105 C |
| 5,634,542 A * | 6/1997 | Grosse-Erdmann et al. | 192/70.27 |
| 5,687,825 A * | 11/1997 | Villata et al. | 192/89.23 |
| 5,785,163 A * | 7/1998 | Bell | 192/70.3 |
| 5,927,459 A * | 7/1999 | Kajitani et al. | 192/70.27 |
| 6,105,258 A * | 8/2000 | Akaike | 30/276 |
| 6,394,254 B1 | 5/2002 | Ijames | |
| 2002/0179398 A1* | 12/2002 | Mokdad et al. | 192/70.27 |
| 2005/0121282 A1* | 6/2005 | Fox | 192/70.19 |

* cited by examiner

CENTRIFUGALLY ASSISTED CLUTCH

CROSS-REFERENCE TO RELATED APPLICATIONS

This application is a non-provisional of U.S. Provisional Patent Application Ser. No. 60/430,969, filed Dec. 4, 2002. The entire text of which is hereby incorporated herein by reference.

BACKGROUND OF THE INVENTION

This invention relates generally to friction clutches, and in particular to a clutch assembly that transmits a calibrated amount of centrifugal force.

Friction clutches are widely used in trucks and other automotive vehicles to selectively connect a driving shaft which is a source of rotational power, such as an engine crankshaft, to a driven shaft, such as a transmission input shaft. A typical clutch has a moveable pressure plate connected for rotation with the driving shaft and a friction disk connected for rotation with the driven shaft. When the pressure plate is moved to a position where it clamps the friction disk in operative engagement with a flywheel on the end of the driving shaft, the driven shaft rotates with the flywheel and torque is transmitted from the driving shaft to the driven shaft. When the pressure plate is moved to a position where the friction disk is disengaged from the flywheel, essentially no torque is transmitted and a driver of the vehicle is free to shift gears of the transmission. Existing clutches to which the present invention applies may include multiple pressure plates and friction disks that are compressed by action of the clutch to engage the flywheel and driven shaft.

One or more springs mounted on the cover plate bias the pressure plate to the position where the friction disk engages the flywheel. In one existing design, a conical spring diaphragm is mounted on the cover to exert an axial force on the pressure plate in its extended conical position and to release the pressure plate when flattened by the force applied by a release bearing initiated by depressing the clutch pedal of the vehicle. The spring must be provided with a tension that is sufficiently high to exert adequate pressure on the pressure plate to prevent slipping of the clutch while still permitting ease of disengagement of the clutch through the clutch pedal of the vehicle.

Recent trucks and other automotive vehicles include engines of significantly greater horsepower and torque that require clutches which transmit more power. Each clutch must provide a correspondingly greater plate load to hold the pressure plate in clamped engagement with the friction disk. To facilitate a larger plate load, some clutches include springs of increased size or a greater number of springs (including compression springs) to apply a larger force urging the pressure plate against the friction disk. Unfortunately, these springs can detrimentally increase weight and volume of the clutch. Further, since the driver must oppose a larger spring force when pressing upon the foot pedal, the clutch is more difficult to operate. These clutches are complex, costly, and less reliable. Also, existing centrifugally assisted clutch designs that are known in the art lack a simple retrofit that can be installed on a standard OEM clutch assembly to convert a standard clutch design into a centrifugally assisted clutch.

SUMMARY OF THE INVENTION

Among the several objects and features of the present invention may be noted the provision of a clutch suitable for use in vehicles with higher torque engines; the provision of such a clutch that transmits larger forces without increasing size or weight of the clutch; the provision of such a clutch that transmits larger forces upon increasing rotational speeds, the provision of such a clutch that can be calibrated to exert incrementally larger forces upon incremental increases in rotational speed; the provision of such a clutch that minimizes force that must be applied to disengage the clutch; the provision of such a clutch which is reliable; the provision of such a clutch that is economical; and the provision of a lever cartridge and method of converting a conventional clutch into a centrifugally assisted a clutch.

In general, a friction clutch assembly for connecting driving and driven shafts has a pressure plate adapted for operative attachment to the driven shaft for rotation therewith. The pressure plate is axially moveable between an engaged position wherein the pressure plate applies a force to clamp a friction disk of the driven shaft in operative engagement with a flywheel of the driving shaft thereby to transmit torque from the driving shaft to the driven shaft and a disengaged position wherein the pressure plate does not clamp the friction disk and substantially no torque is transmitted. A cover is adapted for mounting on the flywheel in a fixed axial position relative to the flywheel and for conjoint rotation with the flywheel. At least one spring is adapted for mounting to the cover and in contact with the pressure plate whereby the spring urges the pressure plate into the engaged position and compression of the spring releases pressure on the pressure plate allowing for movement of the pressure plate to the disengaged position. At least one lever assembly has a cartridge adapted for mounting on the cover, a lever pivotable in the cartridge to contact the pressure plate and apply an axial force urging the pressure plate to the engaged position, and a lever assembly spring associated with the cartridge to bias against the pivoting movement of the lever and delay the pivoting movement of the lever until the clutch assembly reaches a predetermined rotational speed.

In another aspect of the invention, the friction clutch assembly of the present invention has a plurality of lever assemblies adapted for mounting on the cover. The lever assemblies have a lever configured for pivotal contact with the pressure plate to apply an axial force urging the pressure plate to the engaged position. The lever assemblies are spaced at different radial distances from the center of the cover for incremental application of the axial force at increasing rotational speeds of the assembly.

Another aspect of the invention is a method of converting a clutch into a centrifugally assisted clutch. The method comprises providing at least one centrifugal lever cartridge including a lever pivotable in the cartridge for applying a force to a pressure plate of the clutch. An opening is formed for the cartridge in a cover of the clutch. The cartridge is inserted in the opening and secured to the cover.

In another aspect of the invention, a centrifugal lever cartridge for a clutch has a housing sized and shaped for mounting on a clutch cover. A lever is pivotably mounted on the housing for movement to apply a force in response to rotation of the clutch cover to a pressure plate of a clutch.

Other objects and features of the present invention will be in part apparent and in part pointed out hereinafter.

BRIEF DESCRIPTION OF THE DRAWINGS

Corresponding reference characters indicate corresponding parts throughout the several views of the drawings

DETAILED DESCRIPTION OF THE PREFERRED EMBODIMENTS

Figure 1:
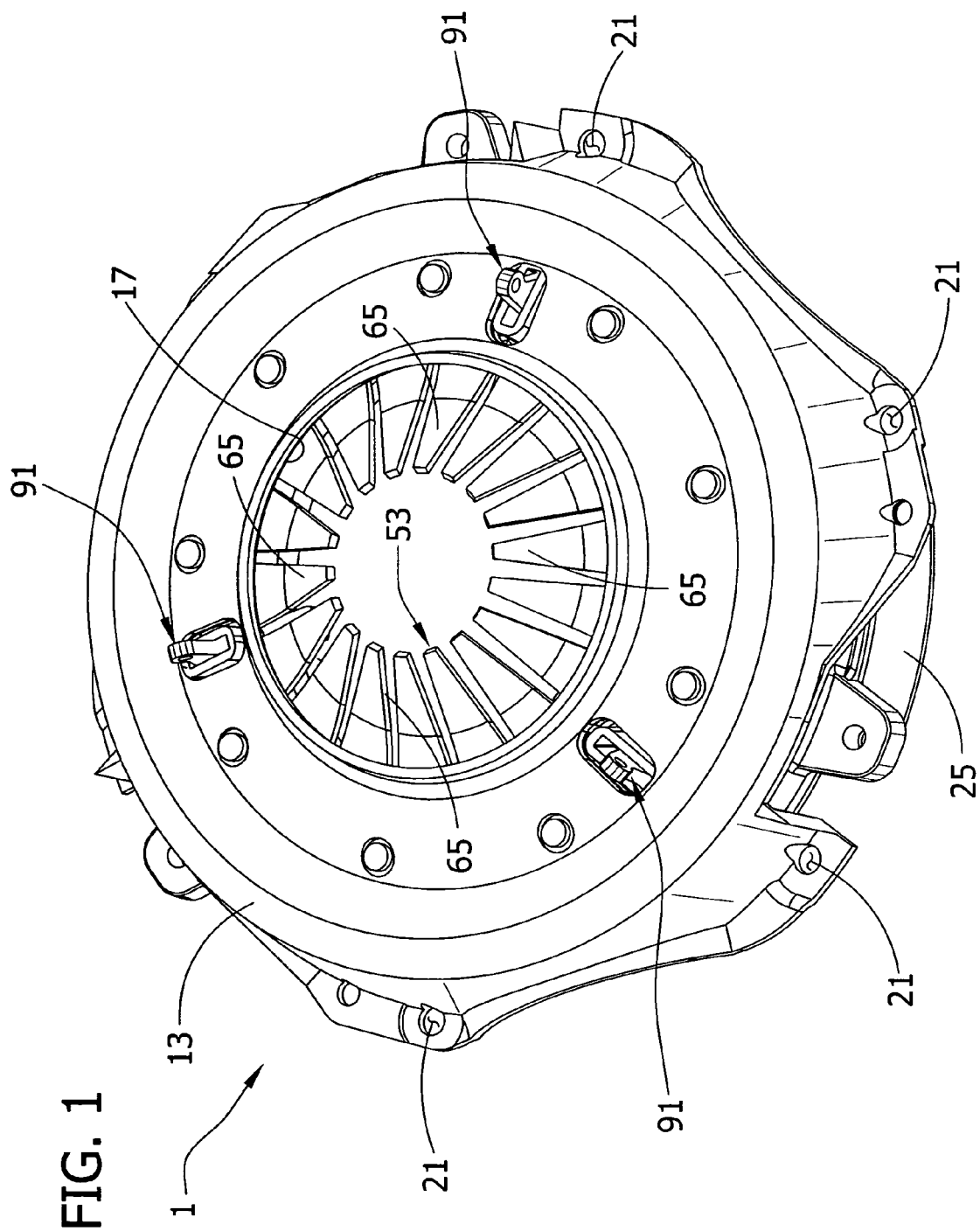
FIG. 1 is a top perspective of a friction clutch assembly of the present invention.

Referring now to the drawings and in particular to FIGS. 1–5, a friction clutch assembly of the present invention is indicated generally at 1. The clutch interconnects a powered, driving shaft A (FIG. 5) to a driven shaft B. Typically the driving shaft A is an engine crankshaft of an automotive vehicle (e.g., truck) which is attached to a flywheel F, and the driven shaft B is a transmission gearbox input shaft. The driving shaft A and driven shaft B are axially aligned and can be operatively connected through the clutch 1 so that torque is transmitted and the shafts rotate together. A driver of the vehicle uses the clutch 1 to selectively disconnect the shafts A, B interrupting the transmission of torque, in order to permit a gear shifting operation in the transmission.

Figure 3:
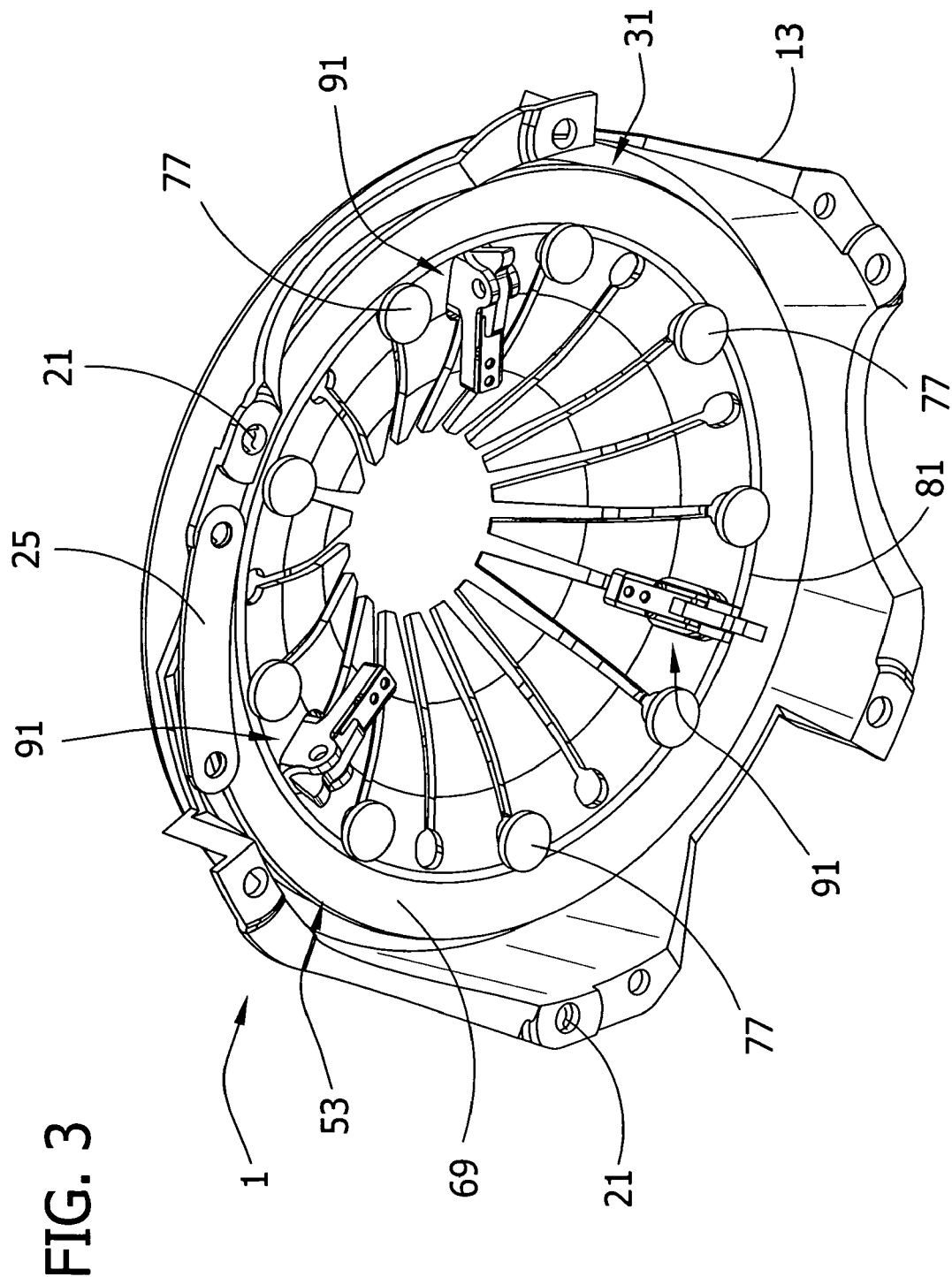
FIG. 3 is bottom perspective of a cover removed from the friction clutch assembly.
Figure 4:
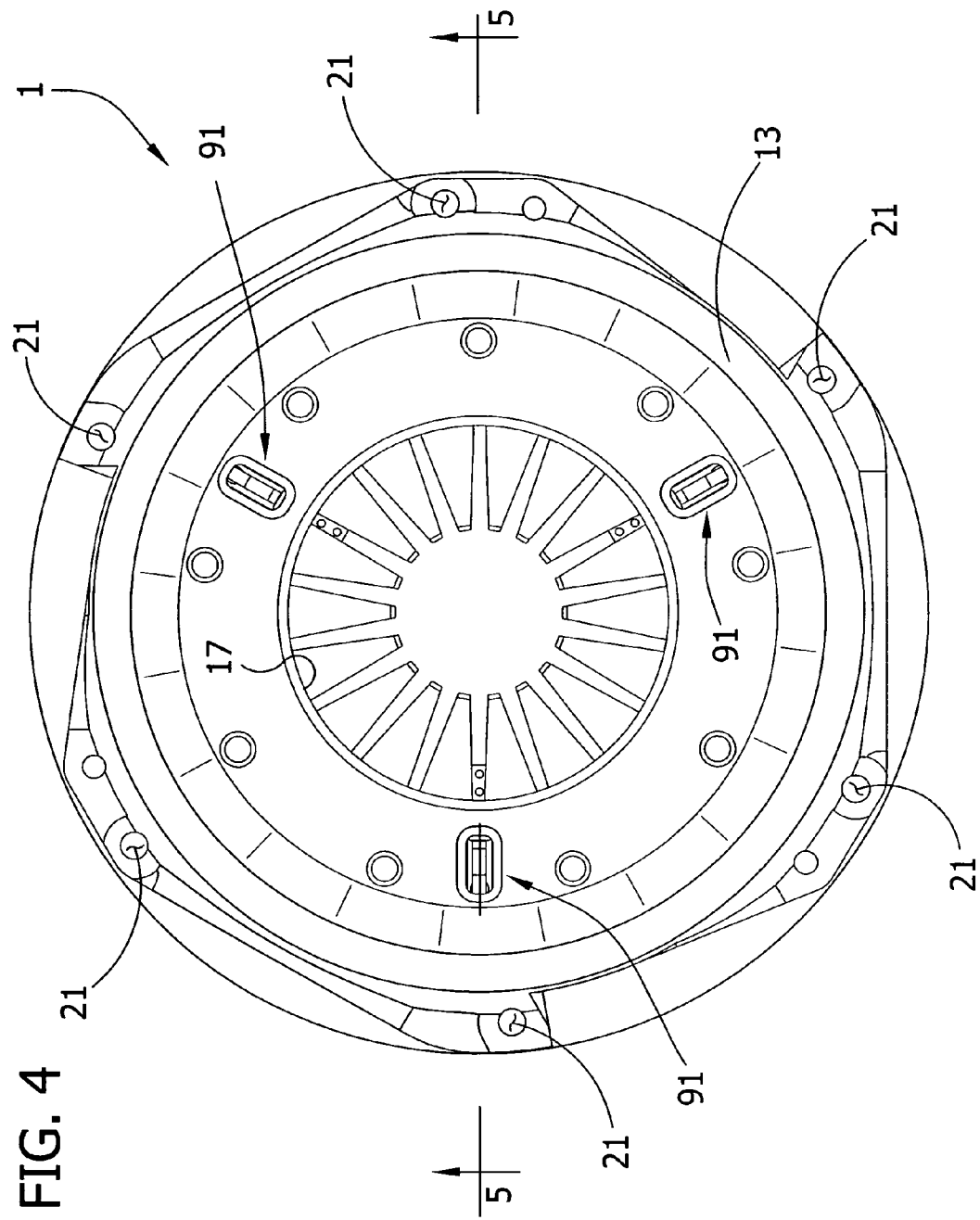
FIG. 4 is a top plan view of the friction clutch assembly.

The clutch 1 includes a bowl-shaped cover 13 which is attached to the driving shaft A and which rotates with the driving shaft. It will be readily appreciated by those of ordinary skill in the art that the cover 13 could have other shapes, such as that of a flat plate. The flywheel F rotates with the engine crankshaft A and functions as a balancer for the engine, dampening vibrations and adding inertia to the crankshaft. The flywheel F provides a machined surface for contact with the clutch 1 to transmit torque to the transmission. The cover 13 generally houses the components of the clutch assembly 1 and is mounted in stationary axial position relative to the flywheel F. The cover 13 has a central opening 17 and a plurality of circumferentially spaced holes 21 for attachment to the flywheel F. Three retractor springs 25, one of which is shown in FIGS. 1 and 3, are attached to the cover by rivets (not shown) spaced around the circumference of the cover 13.

Figure 2:
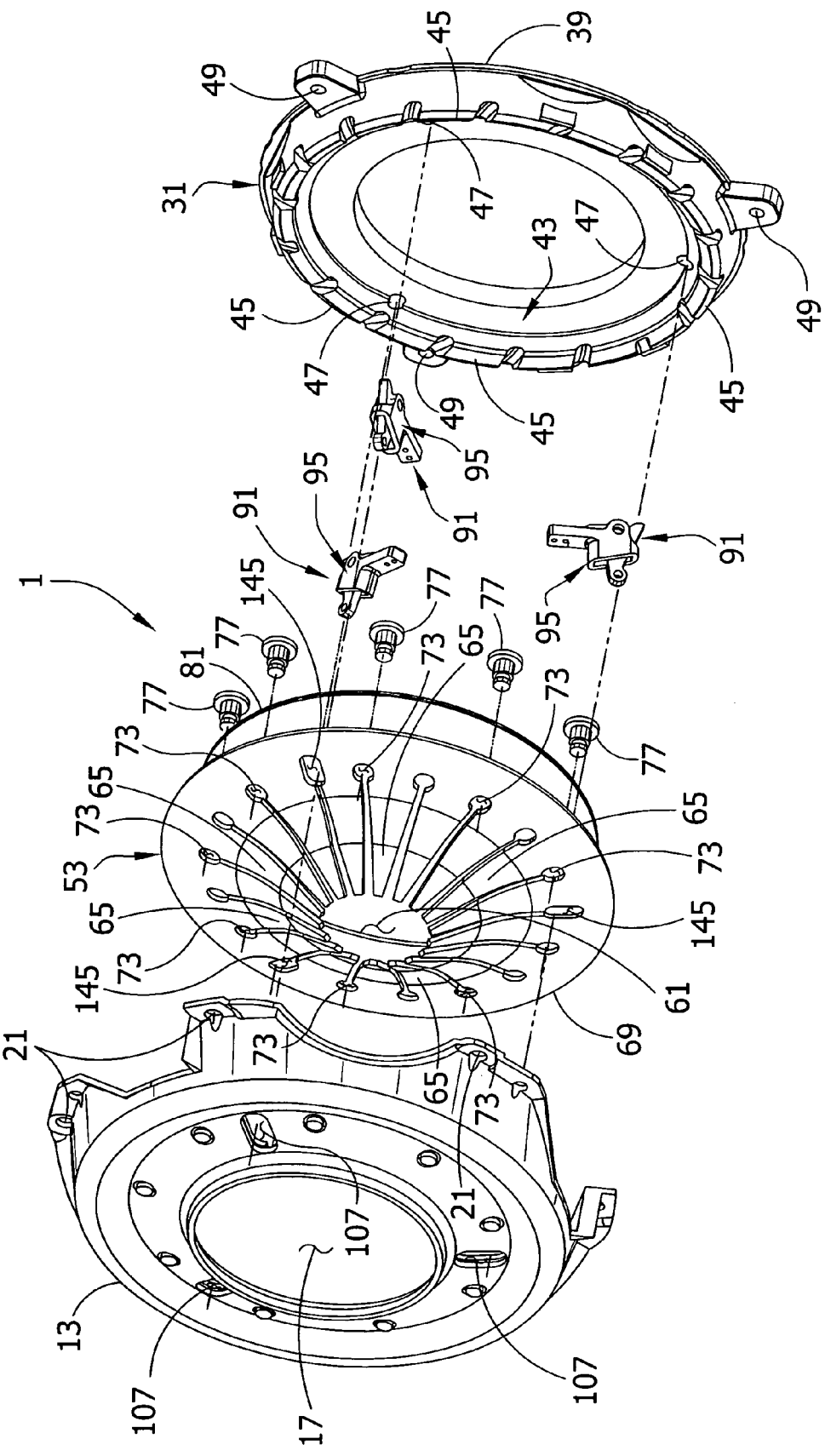
FIG. 2 is an exploded perspective of the clutch assembly.
Figure 5:
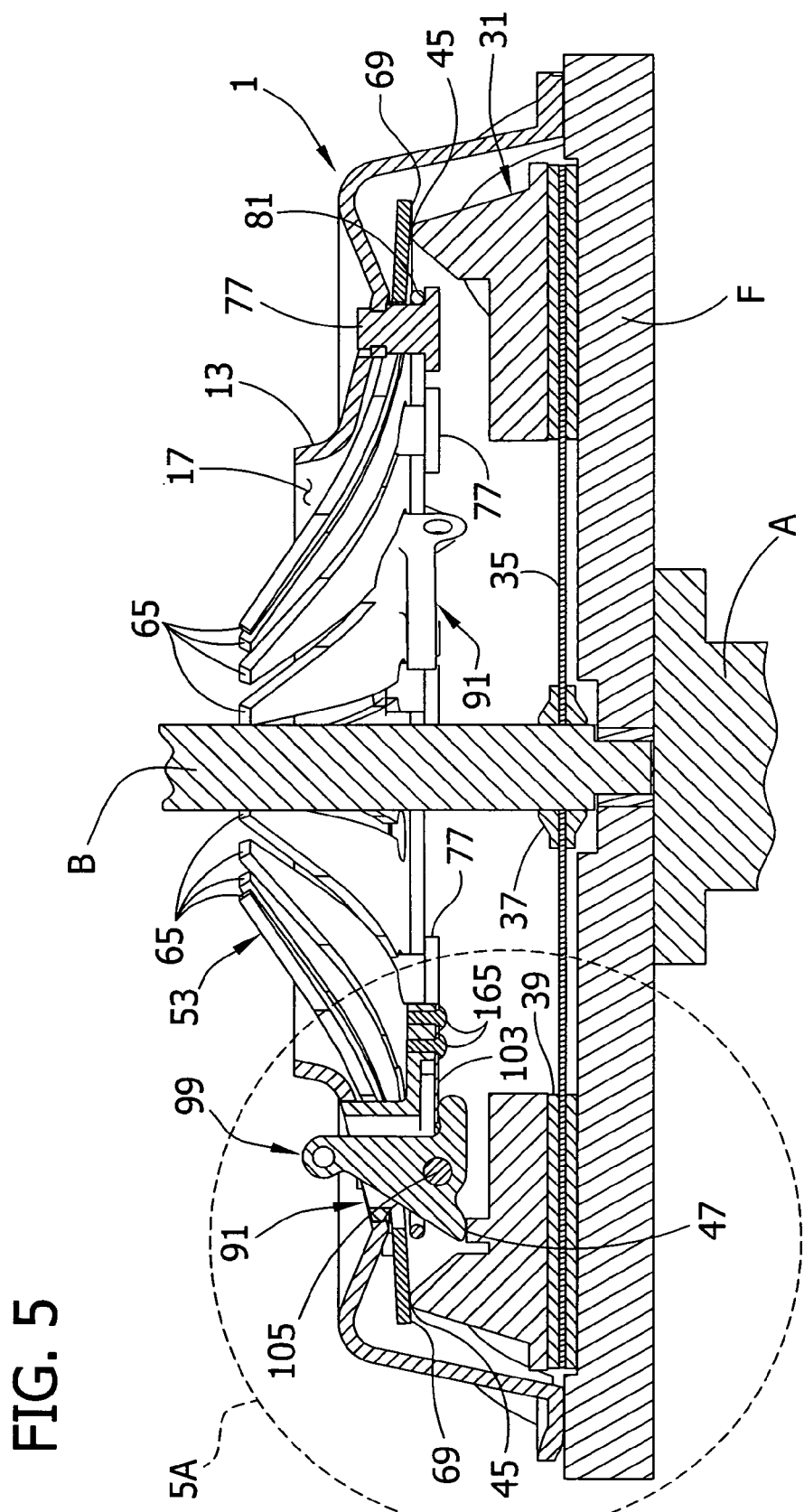
FIG. 5 is section of the friction clutch assembly taken along the plane indicated by line 5—5 of FIG. 4 and further depicting driving and driven shafts and a flywheel.

As shown in FIG. 5, a pressure plate, generally indicated 31, is adapted for selectively clamping at least one friction disk 35 in engagement against the flywheel F. The friction disk 35 is disposed between the pressure plate 31 and the flywheel F for use in interconnecting the driven shaft B and flywheel for conjoint rotation. Although only one friction disk 35 is illustrated, multiple friction disks may be used in the present invention. The friction disk 35 has a splined hub 37 that is engageable with the driven shaft B so that the friction disk rotates with the driven shaft and allows the friction disk to axially move relative to the driven shaft. The pressure plate 31 is axially moveable between an engaged position wherein the pressure plate operatively engages the flywheel F by way of the friction disk 35 thereby to transmit torque from the driving shaft A to the driven shaft B and a disengaged position wherein the friction disk is disengaged from the flywheel and substantially no torque is transmitted. As shown in FIGS. 2, 3 and 5, the pressure plate 31 is a generally annular plate with a smooth lower face 39 for contact with the friction disk and an upper face, generally indicated 43, having a plurality of raised contact surfaces 45. The upper face 43 of the pressure plate has three contact pads 47 spaced radially inward from the raised contact surfaces 45. As shown in FIG. 2, the pressure plate 31 has three angularly spaced bores 49 for receiving threaded fasteners (not shown) that attach the pressure plate to the retractor springs 25 (FIG. 3) riveted to the cover 13. The retractor springs 25 rotationally lock the cover 13 and the pressure plate 31 while permitting axial movement of the pressure plate relative to the cover and the friction disk 35.

A spring, generally indicated 53, is mounted to the cover 13 such that the spring biases the pressure plate 31 to the engaged position. In the illustrated embodiment, the spring 53 is a diaphragm spring, commonly referred to as a Belleville spring, that has a plurality of radial slots extending outward from a center opening 61 of the spring to define a plurality of radial fingers 65 that project upwardly through the central opening 17 of the cover 13. The spring 53 has a generally flat outer annular surface 69 and a plurality of apertures 73 generally near the base of the radial fingers 65. As shown in FIG. 1–5, the spring 53 is connected to the cover 13 by a plurality of rivets 77 which project through the apertures 73 and extend though openings in the cover 13. The rivets 77 secure a pivot ring 81 (FIG. 5) to the spring 53 that allows pivoting of the flat annular surface 69 in response to flexing of the radial fingers 65. In the illustrated embodiment, the spring 53 is held by the cover 13 in a position deflected from its relaxed, roughly conical configuration. As a result, the outer surface 69 of the spring is biased to press against the raised contact surfaces 45 of the pressure plate 31 to apply an axial force from the spring urging the pressure plate to the engaged position. When the radial fingers 65 of the spring 53 are depressed by a release bearing (not shown) actuated by the clutch pedal of the vehicle, the flat annular surface 69 of the spring pivots away from the pressure plate 31 to allow the pressure plate to move to the disengaged position. It is believed that the clutch 1 of the present invention may be able to employ a lighter weight Belleville spring 53 for reasons described hereinafter.

Figure 5A:
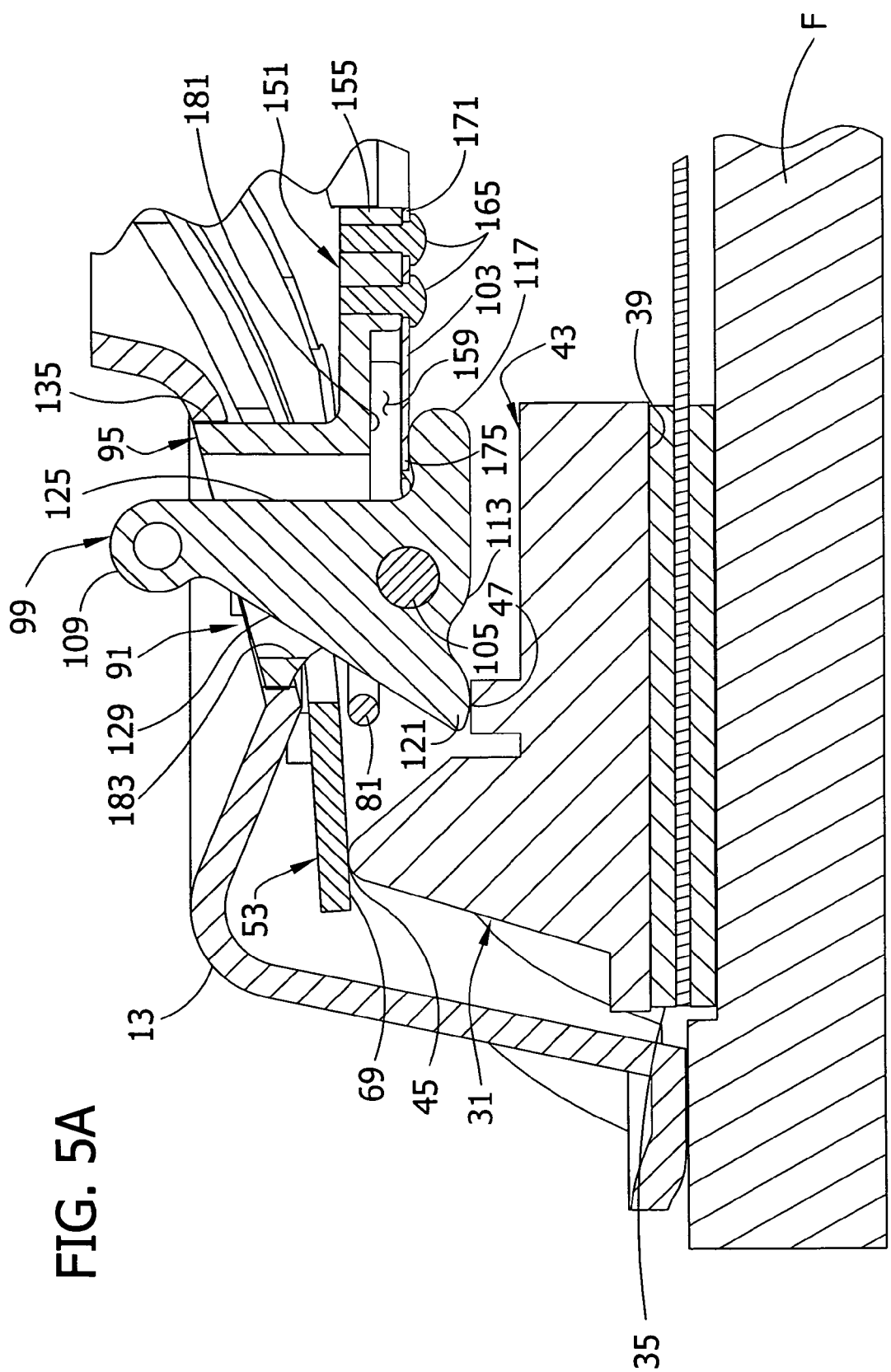
FIG. 5A is an enlarged fragment of FIG. 5.
Figure 5B:
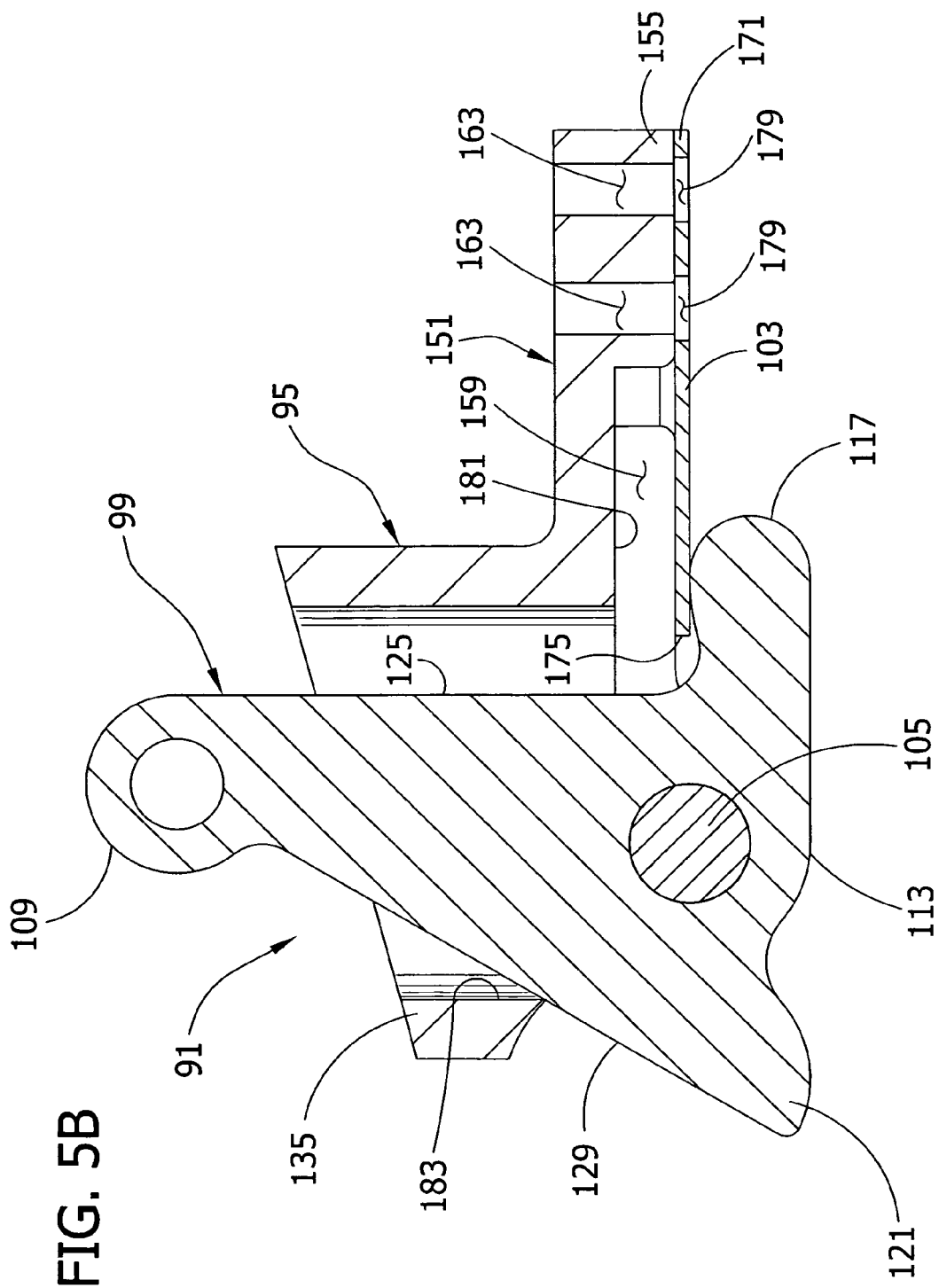
FIG. 5B is a detail section of a lever assembly removed from the friction clutch assembly.

In the illustrated embodiment, three lever assemblies, generally indicated 91, are circumferentially spaced around the clutch 1 so that the lever assemblies rotate with the clutch assembly at the speed of the driving shaft A. Each lever assembly 91 has a cartridge (housing), generally indicated 95, attached to the cover 13 and a lever, generally indicated 99, pivotally attached to the cartridge that pivots against a plate spring 103 in response to centrifugal force of the rotating assembly 1. As shown in FIGS. 5 and 5A, each lever 99 is attached to the cartridge 95 by a pin 105 and is free to pivot about the pin with respect to the remaining components of the clutch assembly 1. The rotation of the clutch assembly 1 at the rotational speed of the driving shaft A causes a centrifugal force acting on each of the levers 99 that are free to pivot in a respective cartridge 95 in response to the rotation of the clutch assembly. The centrifugal force acting on each of the levers 99 causes a torque that tends to rotate each lever about the pin 105. The lever assemblies 91 are shaped and arranged such that one end of each lever 99 is in contact with the pressure plate 31 so that as each lever pivots about a respective pin 105, the torque on the lever due to the rotation of the clutch assembly is converted to an axial contact force acting on the pressure plate. Each lever assembly 91 provides a distinct axial contact force acting on the pressure plate 31 that augments the axial force applied by the diaphragm spring 53 to urge the pressure plate toward the engaged position. In the illustrated embodiment, each cartridge 95 is received in a respective opening 107 (FIG. 2) in the cover 13 and attached to the cover by welding. It will be understood that the illustrated embodiment including lever assemblies 91 with cartridges 95 can be easily retrofit to an existing OEM clutch assembly by modifying the existing components (e.g., spring 53 and cover 13) to accommodate the cartridge. However, the present invention does not require a cartridge 95, as the lever 99 and spring 103 may be integrated with the cover 13 in the manufacture of an OEM clutch assembly.

Figure 6:
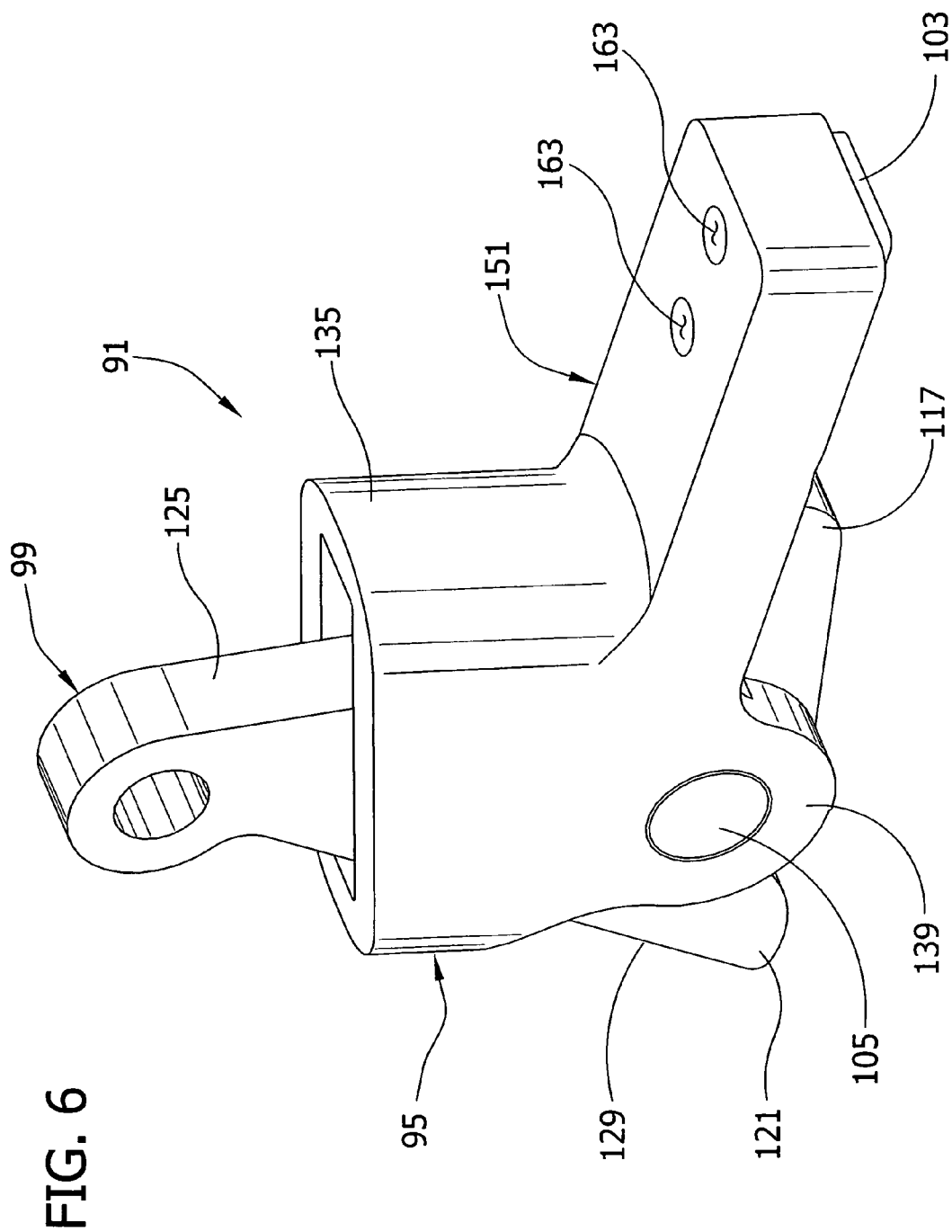
FIG. 6 is a detail perspective of a lever assembly removed from the friction clutch assembly.
Figure 7:
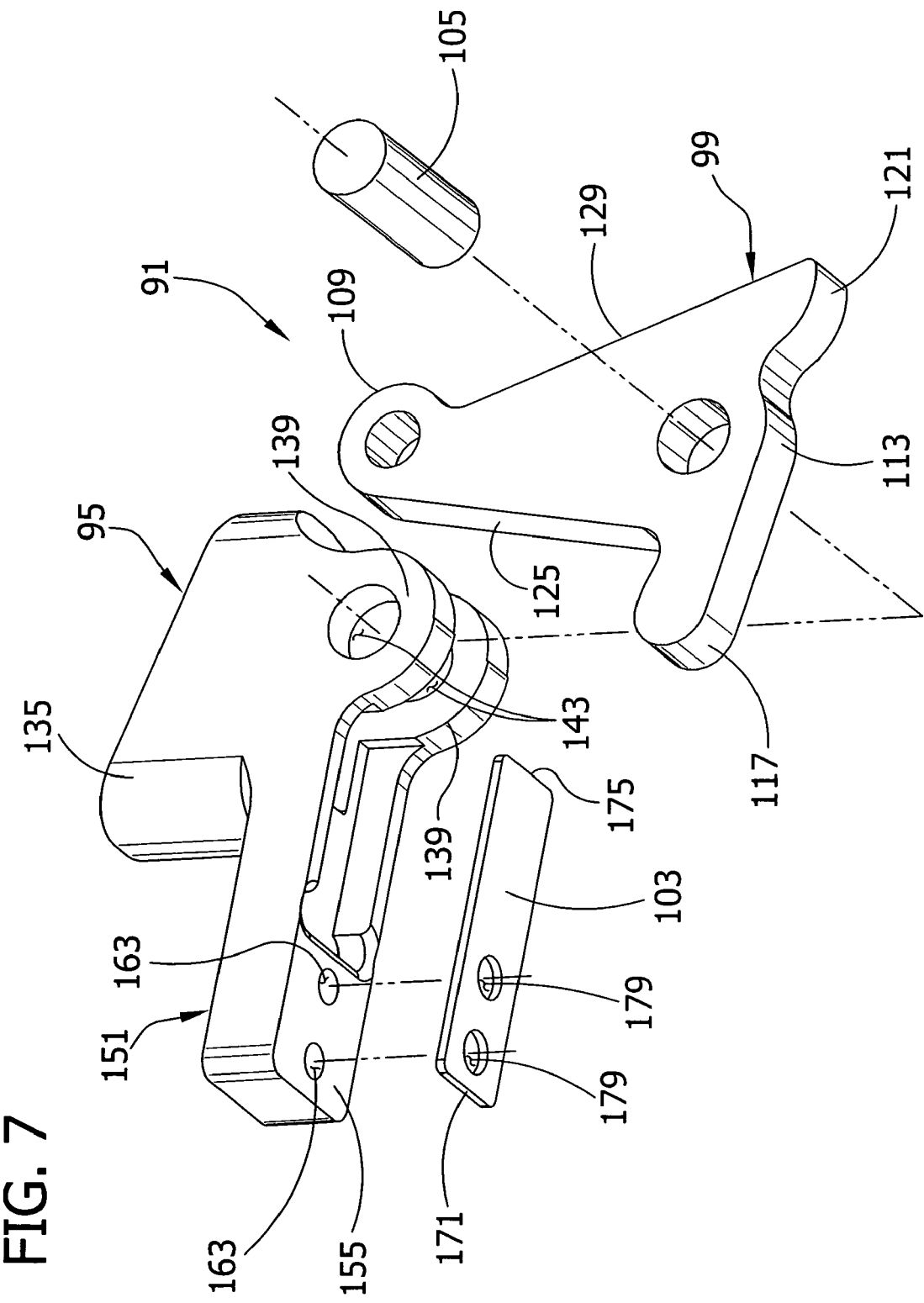
FIG. 7 is an exploded perspective of the lever assembly of FIG. 6.

In the illustrated embodiment, each lever 99 is pivotally disposed in a tubular portion of the cartridge 95 to engage the plate spring 103 at one end and the pressure plate 31 at the other end. As shown in FIGS. 5–7, the lever 99 is a generally flat plate having a rounded head 109 protruding above the cover 13 and a base having a curved bottom surface 113, a rounded toe 117 defining the radially inward edge of the lever, and a rounded heel 121 defining the radially outward edge of the lever. In the illustrated embodiment, the lever 99 has a generally straight inward surface 125 extending downward from the head 109 to the toe 117 of the base and an inclined outward surface 129 extending downward from the head to the heel 121 of the base. As shown in FIGS. 5 and 5A, the lever 99 is configured such that the rotation of the clutch assembly 1 causes a centrifugal force tending to pivot the lever in the cartridge 95 so that the heel 121 of the lever engages the contact pad 47 of the pressure plate 31, and the toe 117 of the, lever engages the spring 103. The heel 121 has a rounded contact surface with a relatively large radius of curvature (preferably about 0.25 in.) to inhibit gouging of the pressure plate 31 when the lever 99 pivots into engagement with the plate. Preferably, the lever 99 is made from heat treated steel or other suitable wear resistant material. It will be understood that the lever 99 may have other sizes and configurations so that the force applied by the lever can be adjusted.

Figure 5C:
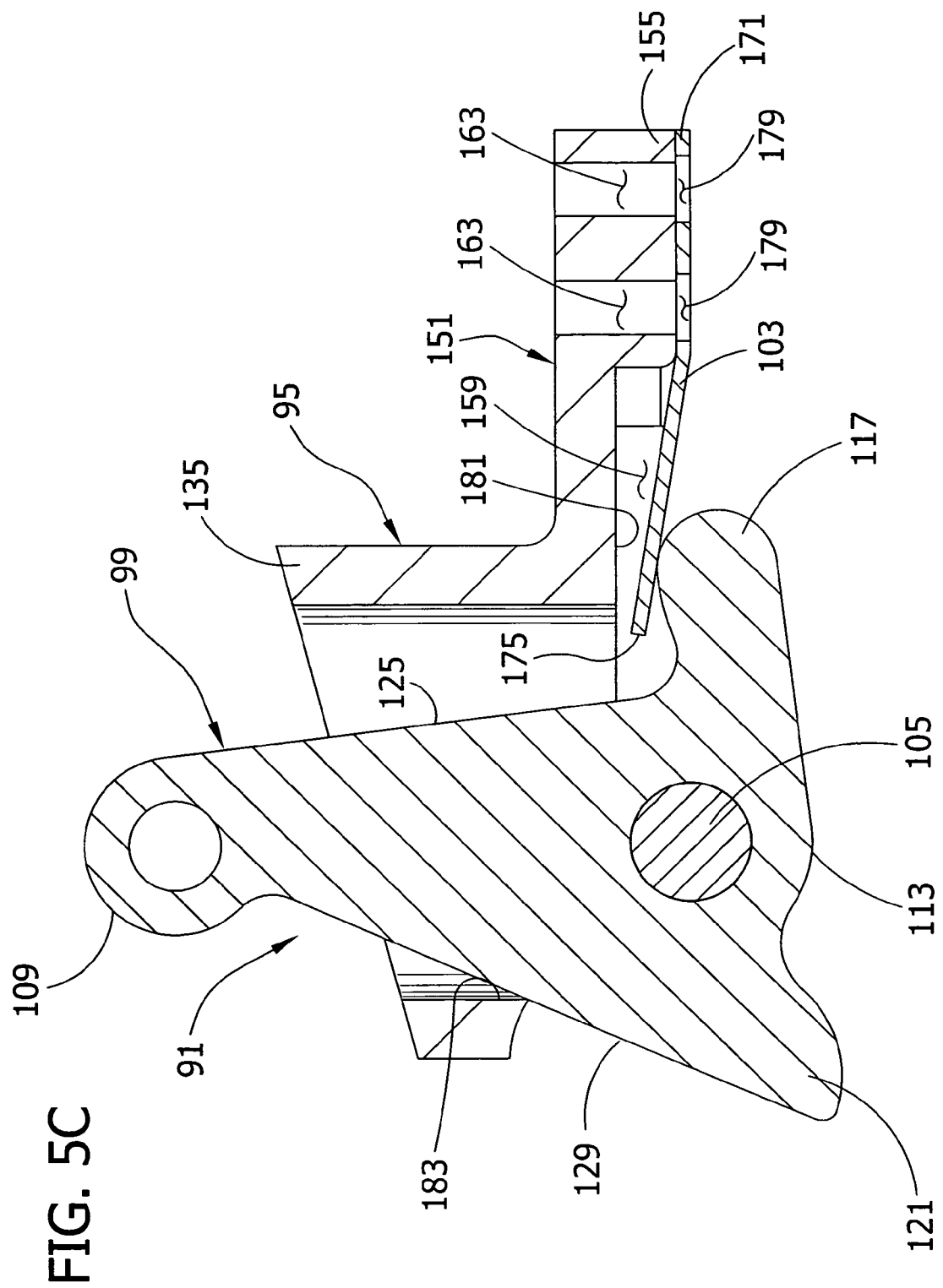
FIG. 5C is a view similar to FIG. 5B but showing the lever assembly in a pivoted position.

As shown in FIGS. 5–7, the cartridge 95 has a rear chamber 135 welded to the cover 13 and two protrusions 139 at the base of the rear chamber that have axially aligned openings 143 (FIG. 7) for receiving the pin 105 to pivotally connect the lever 99 to the cartridge 95. As shown in FIG. 2, the cartridge 95 is received in openings 145 between the radial fingers 65 of the diaphragm spring 53. In the illustrated embodiment, the pin 105 is held in the aligned openings 143 by an interference fit but it will be understood that the pin could be fixed in the cartridge 95 by other conventional means (i.e., press fit, stamping/end deformation, threaded end fasteners, etc.). As shown in FIGS. 5–7, the cartridge 95 has a base, generally designated 151, extending from the rear chamber 135 having a stepped bottom surface with an inward portion 155 for receiving the plate spring 103 and a raised surface forming a deflection cavity 159 adjacent the inward portion. The inward portion 155 of the base 151 has two mounting holes 163 passing through the base that receive threaded fasteners 165 (FIG. 5A) that secure the plate spring 103 to the cartridge 95. The spring 103 has a fixed end 171 attached to the inward portion 155 of the base 151, a free end 175 that is engaged by the rounded toe 117 of the lever 99, and two mounting holes 179 that receive threaded fasteners 165. As shown in FIGS. 5–5C, the cartridge 95 has two pivot stops 181, 183 that limit the pivoting motion of the lever 99 to prevent the lever from going over center and locking the clutch 1 requiring disassembly of the clutch to unlock the components. The first pivot stop 181 is formed on the raised surface of the base 151 of the cartridge 95 to restrict the counterclockwise pivoting movement of the lever 99 by limiting the amount of upward deflection of the plate spring 103. The second pivot stop 183, located in the rear chamber 135 of the cartridge 95, limits the pivoting movement of the lever 99 by contact with the inclined surface 129 of the lever. In the illustrated embodiment, the pivot stops 181, 183 are configured to limit the maximum travel of the lever 99 to approximately one thousandth of an inch. However, it will be understood that clutch designs incorporating pivot stops configured to allow more or less travel of the lever are contemplated by this invention.

Figure 7A:
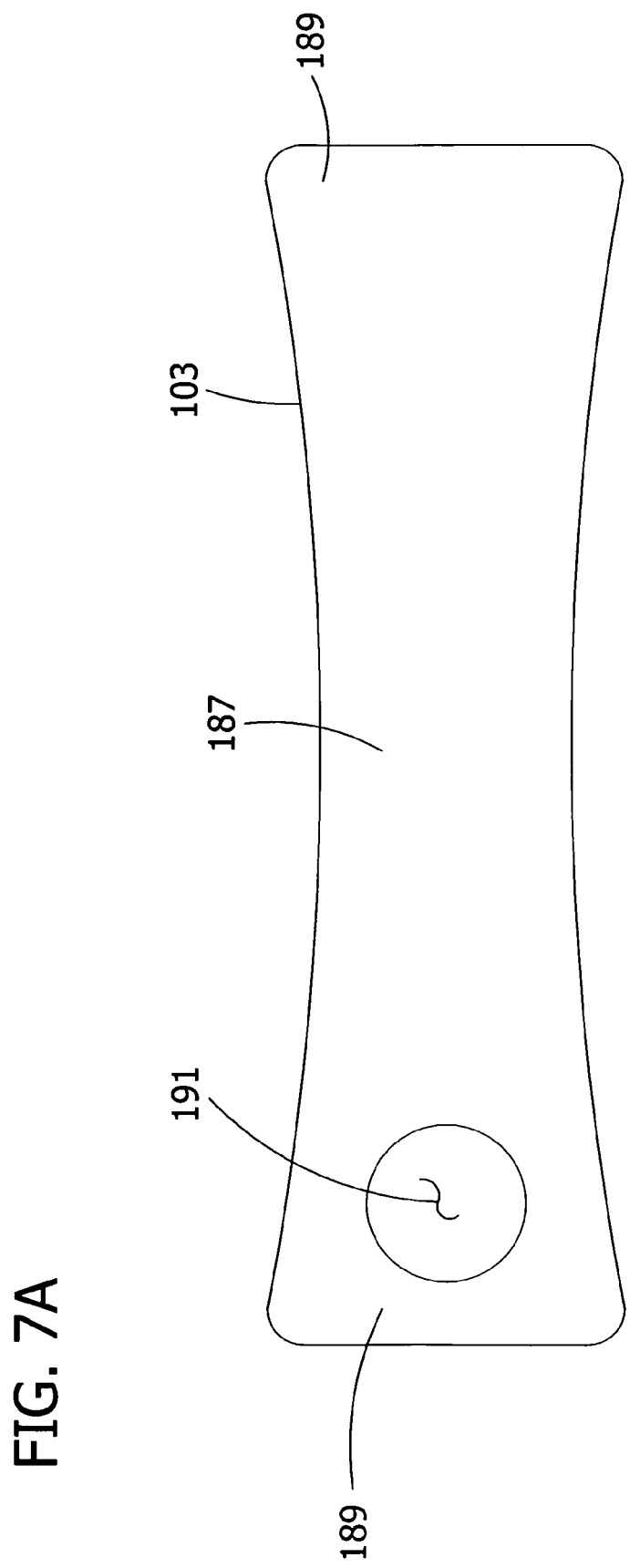
FIG. 7A is a top plan view of an alternative embodiment of a plate spring of the lever assembly.

The force applied by the lever assembly 91 can also be varied by the configuration and material of the spring 103 providing resistance to the pivoting motion of the lever 99. Preferably, the spring 103 is made of blue tempered SAE 1074 spring carbon steel but it will be understood that the spring may be made of other materials such as carbon steel alloys, titanium, composites, or other suitable material. By varying the bend strength of the spring material, the rotational speed at which that the lever assemblies 91 press against the pressure plate 31 can be varied. Also, the size or shape of the springs 103 can be modified to provide more or less spring force to allow selective variation of the driving shaft speed at which the lever 99 exerts force on the pressure plate 31. As shown in FIG. 7A, the spring 103 alternatively may have an hourglass shape with a narrow middle portion 187, a wider base 189 at both ends for contact with the lever 99 and the cartridge 95, and a single mounting hole 191 for attachment to the cartridge. By varying the shape of the spring 103 as shown in FIG. 7A, the stiffness of the spring is reduced so that the lever 99 acts on the pressure plate 31 at a lower rotational speed of the driving shaft A.

In operation, the cover 13 and lever assemblies 91 rotate with the driving shaft A and the centrifugal force of the lever 99 tends to pivot the heel 121 of the lever against the contact pads 47 on the upper face 43 of the pressure plate 31. The force tending to pivot the lever 99 is resisted by the engagement of the spring 103 with the toe 117 of the lever. As the rotational speed of the driven shaft B increases, the centrifugal force acting on the lever 99 increases to a point where the lever will have enough inertia to deflect the spring 103, forcing the heel 121 of the lever into engagement with the pressure plate 31. As the rotational speed of the driving shaft A increases, the spring 103 will further deflect allowing the lever 99 to apply a greater force on the pressure plate 31 at higher speeds. The force from the lever 99 acting on the pressure plate 31 urges the pressure plate to the engaged position to help prevent slippage of the clutch assembly 1 in high speed applications. By using the centrifugal force of the lever assemblies 91 to assist in urging the pressure plate 31 against the friction disk 35, the clutch assembly 1 of the present invention has increased plate loads at higher rotational speeds without requiring a larger spring 53 having higher clutch actuation forces. Thus, the clutch 1 permits transmission of larger torque between the driving shaft A and driven shaft B than prior clutches without any corresponding increase in weight, nor any increase in the force needed to disengage the clutch.

Preferably, the centrifugal assist force would occur just prior to the driving shaft A reaching a peak torque value for the particular vehicle in use. In one example, the clutch 1 is configured so that the centrifugal force from the lever assemblies takes effect at a driving shaft speed of approximately 2000 RPM. However, as discussed above, there could be multiple centrifugal force actuation speeds corresponding to the individual configurations and radial locations of the lever assemblies 91.

Figure 8:
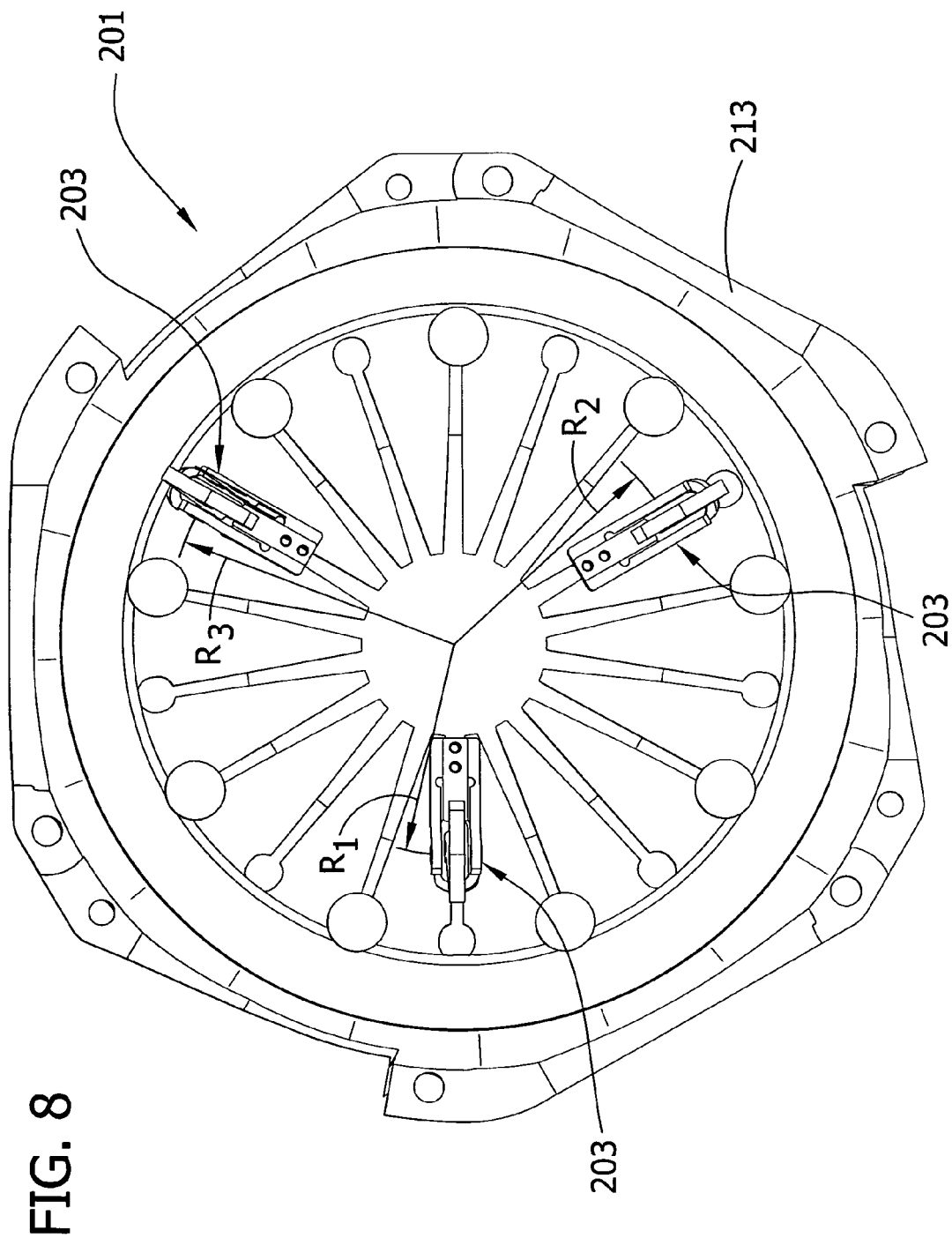
FIG. 8 is a bottom plan view of a second embodiment of the friction clutch assembly.
Figure 9:
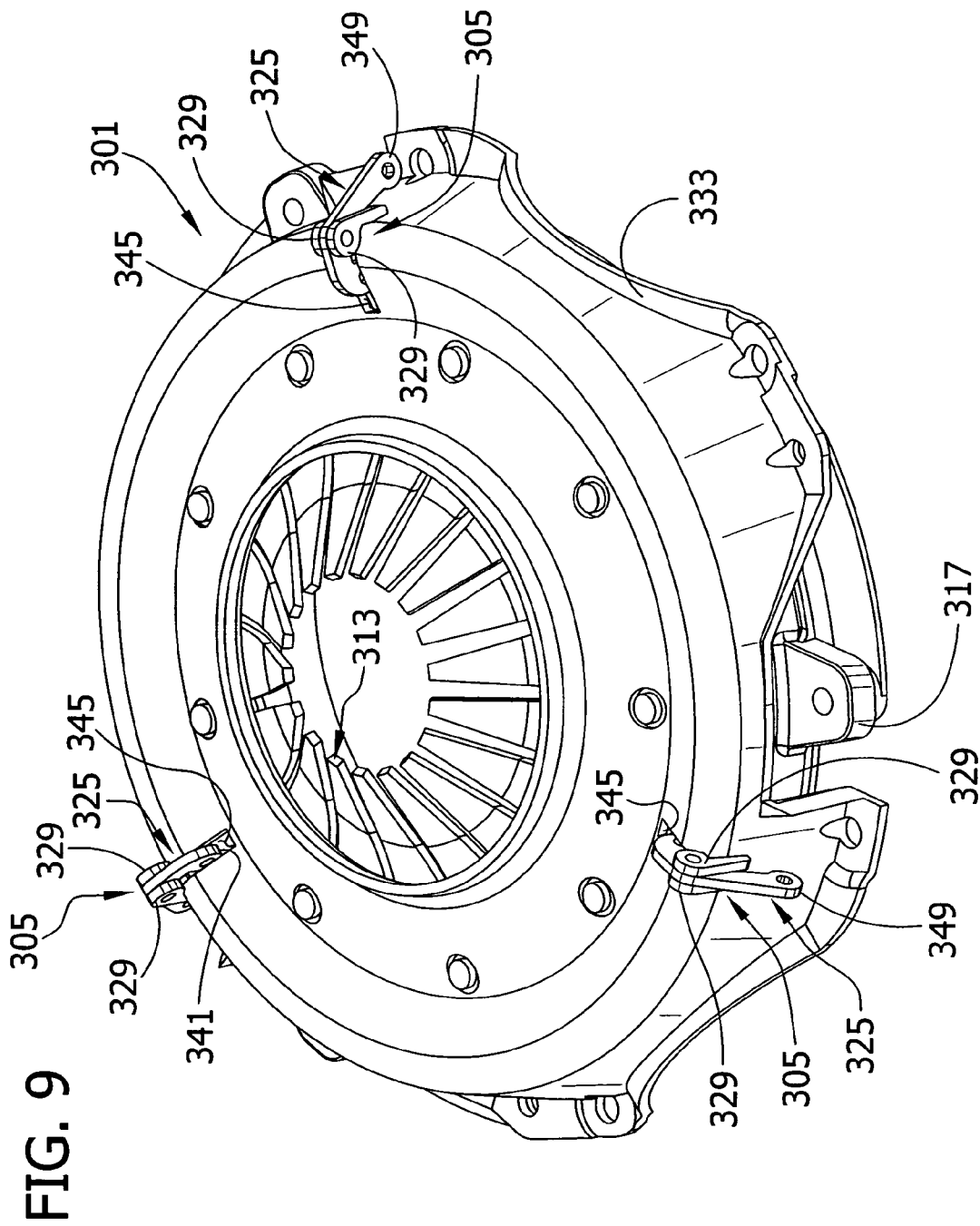
FIG. 9 is a top perspective of a third embodiment of the friction clutch assembly.
Figure 10:
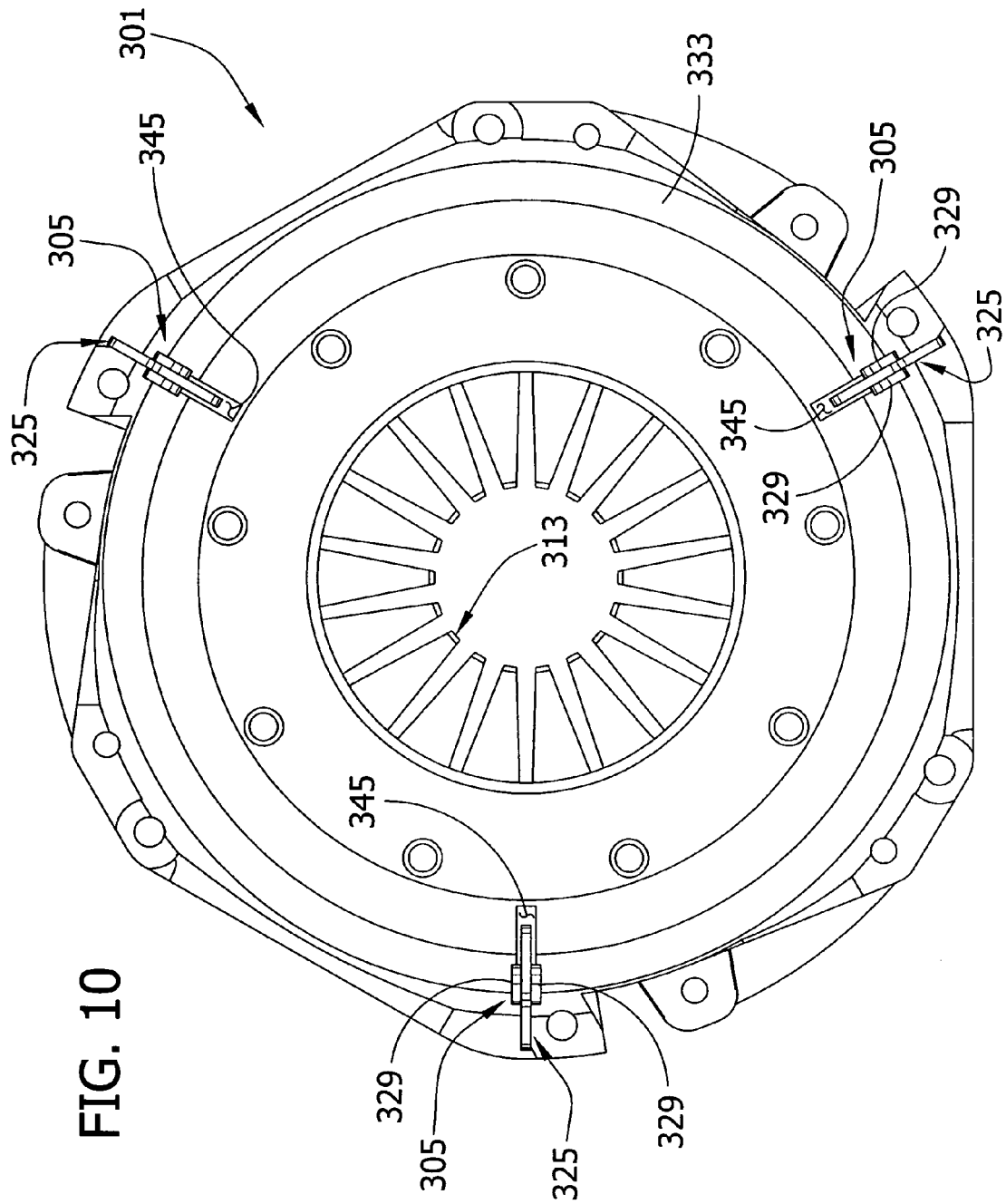
FIG. 10 is a top plan view of the third embodiment.
Figure 11:
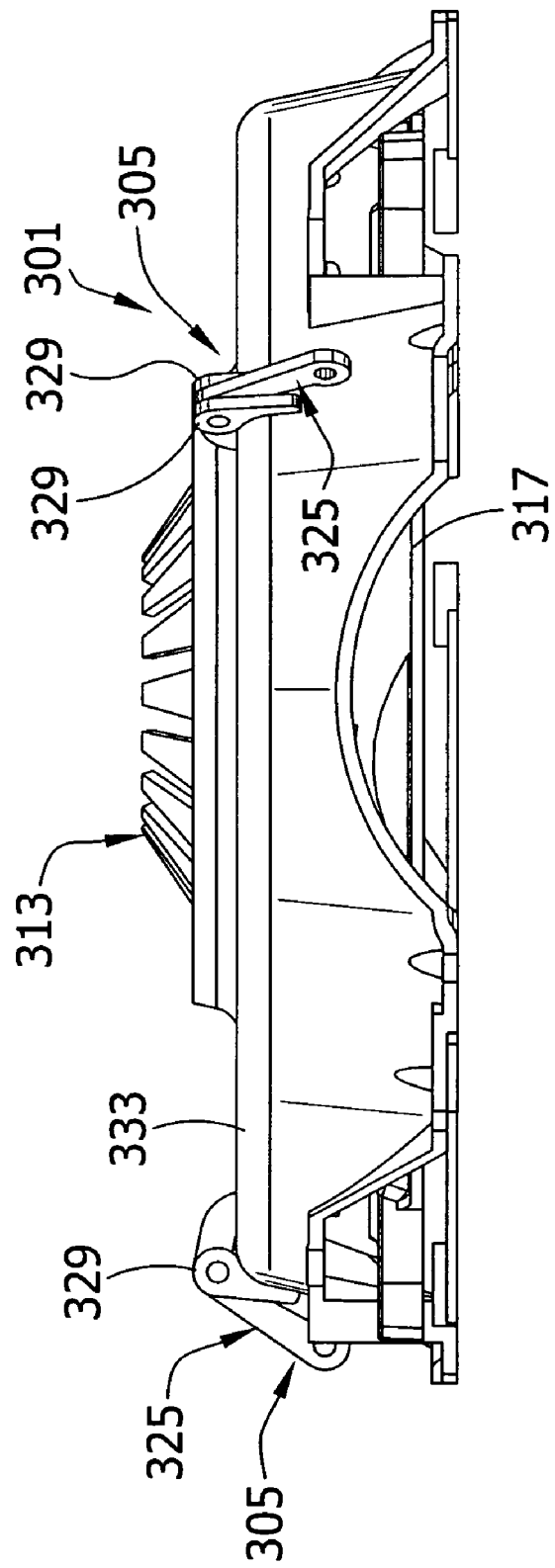
FIG. 11 is a side elevation of the third embodiment.

As shown in the embodiment of FIGS. 1–5, three lever assemblies 91 can be provided with approximately equal radial spacing. However, it will be understood that one, two or greater than three lever assemblies 91 could also be provided. FIG. 8 shows an exemplary alternative embodiment of the present invention, generally designated 201, having multiple lever assemblies generally designated 203 and spaced at varying radial distances $R_1$, $R_2$, and $R_3$ from the center of the cover 213. The variable radial spacing of the lever assemblies 203 causes each lever assembly to rotate at a respective instantaneous linear velocity and provide a distinct amount of force that is actuated at different rotational speeds of the clutch assembly 201. A strategic placement of the lever assemblies 203 at different radial distances from the center of the cover 213 allows for an incremental increase in axial force applied to the pressure plate 31 to assist retaining the pressure plate in the engaged position at incrementally higher rotational speeds of the assembly 201. For instance, the most inwardly located lever assembly 203 of FIG. 8 will have the lowest instantaneous linear velocity at a given rotational speed of the driving shaft A because the lever assembly has the shortest radial distance $R_1$ from the center of the cover 213. The reduced linear velocity of the most inward positioned lever assembly 203, results in comparatively less centrifugal force and resulting torque acting on the lever 99. The reduced amount of torque acting on the lever 99 of the innermost lever assembly 203 results in comparatively less axial force exerted by the lever on the pressure plate 31. In contrast, the most outwardly located lever assembly 203, located at a radial distance $R_3$ from the cover 213, has the highest instantaneous linear velocity and corresponding centrifugal force acting on the lever 99. The comparatively higher torque acting on the lever 99 of the outermost lever assembly 203 results in a comparatively larger axial force being exerted by the lever on the pressure plate 31.

FIGS. 9–12 illustrate an alternative embodiment of the clutch assembly, generally designated 301. This embodiment is substantially similar to the clutch assembly 1 of the first embodiment except lever assemblies, generally indicated 305, of this embodiment are positioned for contact with the outer annular portion 309 of the diaphragm spring 313 to apply an axial force urging the pressure plate 317 to the engaged position.

Figure 12:
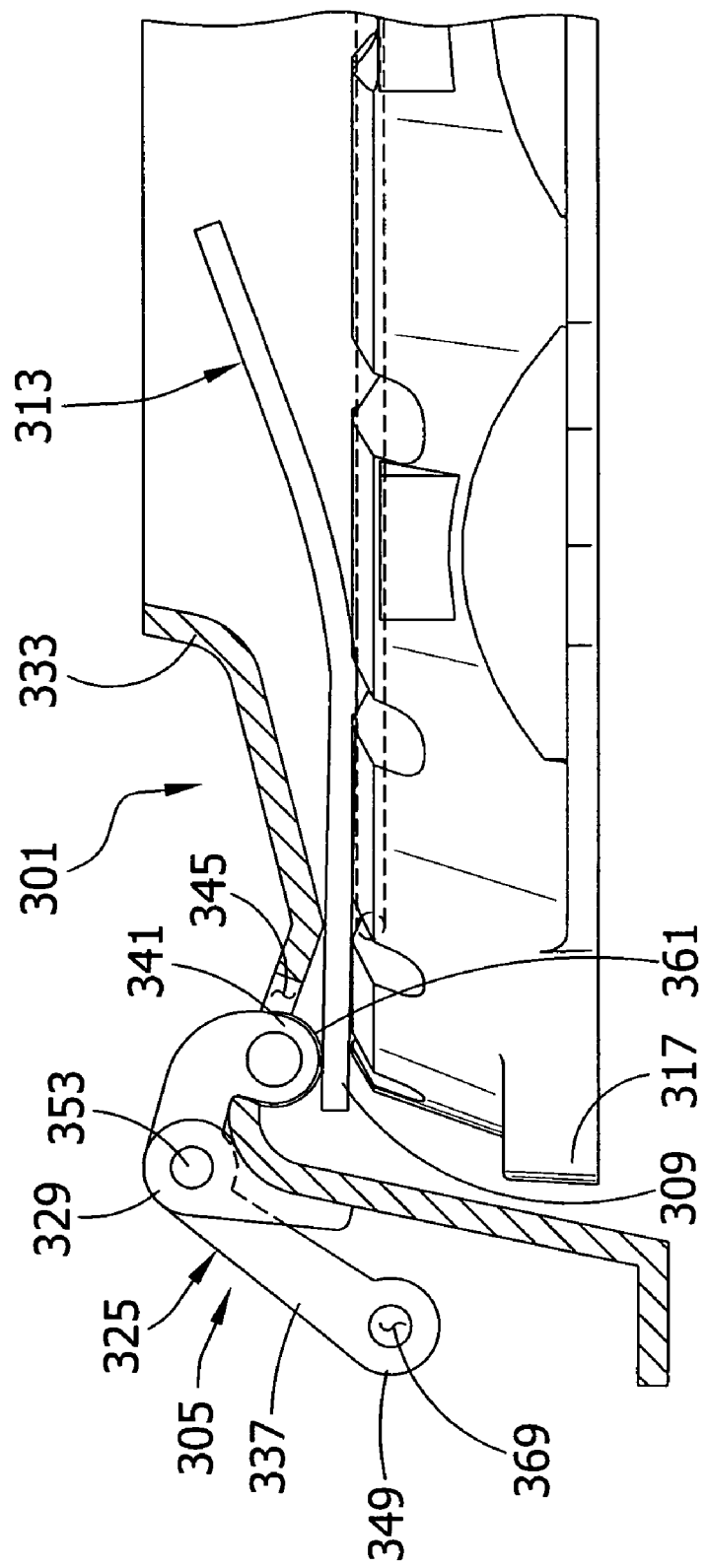
FIG. 12 is a partial section of the third embodiment.

The lever assemblies 305 comprise a lever, generally indicated 325, that is pivotably attached to a housing comprising two spaced apart mounting brackets 329 attached (by welding) to the cover 333. As best seen in FIG. 12, each lever 305 comprises a generally L-shaped body 337 having a rounded head 341 protruding through an opening 345 in the cover and in contact with the outer annular portion 309 of the diaphragm spring 313 and a rounded base 349 generally located outside of the cover. The body 337 of each lever 325 is attached to the mounting brackets 329 by a mounting pin 353 that allows the lever to pivot with respect to the cover 333 and the mounting brackets. The head 341 of each lever 325 is generally housed inside the cover 333 and has a roller 361 that contacts the outer annular portion 309 of the spring 313. The roller 361 may comprise a washer or roller bearing rotatably attached to the head 341 that reduces the friction force acting on the spring 313 when the lever 325 pivots. The roller 361 prevents the lever 325 from gouging or damaging the outer annular portion 309 of the spring 313. The base portion 349 of each lever 325 has a mounting hole 369 for attaching centrifugal weights (not shown) that may be added to the lever to increase the axial force applied by the lever to the pressure plate 317.

It will be understood that the lever assemblies 305 of the clutch assembly 301 may be positioned at various radial positions similar to the lever assemblies 203 shown in FIG. 8. Also, the levers 325 may have other shapes and be otherwise positioned without departing from the scope of this invention.

The present invention also includes a method of converting a clutch into a centrifugally assisted clutch as described above and shown in the drawings. The method comprises the steps of providing at least one centrifugal lever housing 95, 329 (more preferably at least three) including a lever 99, 325 pivotably attached to the housing. An opening 107, 345 is formed in an existing clutch assembly cover 13, 333 located at a radial distance from the central opening 17 of the cover corresponding with the desired radial location of the lever 99, 325. The lever 99, 325 may be inserted into the opening 107, 345 in the cover 13, 333 and the housing in the form of cartridge 95 or brackets 329 secured (as by welding) to the cover so that the housing rotates with the cover and the lever 99, 325 applies and axial force to the pressure plate 31.

If the existing clutch is to be configured for contact of the lever 99 with the pressure plate 31, contact pads 47 may be formed on the existing clutch assembly pressure plate. The contact pads 47 may be attached (as by welding) to the upper face 43 of the existing clutch assembly pressure plate 31 and aligned for contact with the lever 99. In a diaphragm spring type clutch design as shown herein, the additional step of modifying the diaphragm spring 53 (e.g., as by creating the openings 145 between adjacent fingers 65) to receive the cartridge 95 may also be required to complete the retrofit. The cartridge 95 should be positioned in the opening 107 in the cover 13 so that the lever 99 is aligned for contact with the contact pads 47 on the pressure plate 31.

If the existing clutch is to be configured for contact of the lever 325 with the spring 313 no modifications to the existing pressure plate or spring would be required. The lever 325 should be positioned in the opening 345 in the cover 333 such that the lever contacts the outer annular portion 309 of the spring 313 to provide the axial force that urges the pressure plate to the engaged position.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense. For example, one or more lever assemblies 91 constructed in accordance to the present invention may be retrofit to a cover 13 of an existing clutch assembly. Also, the present invention could include lever assemblies 91 incorporated into the cover 13 without requiring a cartridge 95 housing the individual components of the lever assemblies. The clutch assembly 1 of the present invention may be used in many different applications including automotive, motorcycle, marine, industrial, or any type of application requiring a clutch assembly for transmitting torque from a driving shaft A to a driven shaft B. The present invention 1 may also be used with all types of clutches including Belleville or diaphragm spring, coil spring, push or pull, single or multiple plate, or any other type of clutch.

What is claimed is:

1. A method of converting a clutch having at least one spring mounted on a clutch cover into a centrifugally assisted clutch, the method comprising the steps of:
   providing at least one centrifugal lever housing including a lever pivotable in the housing for applying a force to a pressure plate of the clutch;
   forming an opening for the lever in the cover of the clutch;
   inserting the lever in the opening; and
   securing the housing to the cover
   the centrifugal lever housing as secured to the cover being located in a final assembly of the cover with the pressure plate so that the lever is operatively engaged with the pressure elate and free of pivoting connection to the pressure plate.

2. The method of claim 1 wherein said providing at least one lever housing step comprises providing three lever housings.

3. The method of claim 1 wherein said at least one lever housing comprises a cartridge.

4. The method of claim 3 wherein said securing the housing step comprises welding the cartridge to the cover.

5. The method of claim 1 further comprising forming an opening in the spring for the lever.

6. The method of claim 5 further comprising securing a contact pad to the pressure plate of the clutch and aligning the contact pad for contact with the lever.

7. The method of claim 6 wherein said securing the contact pad step comprises welding a contact pad to an upper face of the pressure plate of the clutch.

8. The method of claim 1 wherein said at least one lever housing comprises a mounting bracket.

9. The method of claim 8 wherein said securing the housing step comprises welding the bracket to the cover.

10. The method of claim 1 wherein inserting the lever step comprises aligning the lever for contact with the spring.

11. The method of claim 1 further comprising providing a spring mounted on the housing to provide resistance to the pivoting motion of the lever.

12. A method of converting a clutch having at least one spring mounted on a clutch cover into a centrifugally assisted clutch, the method comprising the steps of:
   providing at least one centrifugal lever housing including a lever pivotable in the housing for applying a force to a pressure plate of the clutch;
   forming an opening for the lever in the cover of the clutch;
   inserting the lever in the opening comprising aligning the lever for contact with the spring; and
   securing the housing to the cover.

13. A method of converting a clutch having at least one spring mounted on a clutch cover into a centrifugally assisted clutch, the method comprising the steps of:
   providing at least one centrifugal lever housing including a lever pivotable in the housing for applying a force to a pressure plate of the clutch;
   forming an opening for the lever in the cover of the clutch;
   inserting the lever in the opening;
   securing the housing to the cover; and
   forming an opening in the spring for the lever.

14. A method of converting a clutch having at least one spring mounted on a clutch cover into a centrifugally assisted clutch, the method comprising the steps of:
   providing at least one centrifugal lever housing including a lever pivotable in the housing for applying a force to a pressure plate of the clutch;
   forming an opening for the housing in the cover of the clutch;
   inserting the housing in the opening; and
   securing the housing as inserted in the opening to the cover.

15. The method of claim 14 wherein said securing the housing step comprises welding the housing to the cover.

16. The method of claim 14 wherein inserting the housing step comprises aligning the lever for contact with the spring.

17. The method of claim 14 further comprising providing a spring mounted on the housing to provide resistance to the pivoting motion of the lever.

* * * * *